United States Patent
Choi

(10) Patent No.: US 10,345,184 B2
(45) Date of Patent: Jul. 9, 2019

(54) APPARATUS AND METHOD FOR DIAGNOSING FAILURE OF SENSOR

(71) Applicant: Hyundai Motor Company, Seoul (KR)

(72) Inventor: Choo Saeng Choi, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 287 days.

(21) Appl. No.: 15/376,411

(22) Filed: Dec. 12, 2016

(65) Prior Publication Data

US 2018/0038760 A1 Feb. 8, 2018

(30) Foreign Application Priority Data

Aug. 3, 2016 (KR) .................. 10-2016-0099033

(51) Int. Cl.
  *G01L 27/00* (2006.01)
  *G01L 13/00* (2006.01)
  *G01M 15/10* (2006.01)

(52) U.S. Cl.
  CPC ............ *G01L 27/007* (2013.01); *G01L 13/00* (2013.01); *G01M 15/106* (2013.01)

(58) Field of Classification Search
  CPC ..... G01L 27/007; G01L 13/00; G01M 15/106
  USPC ......................................................... 73/1.59
  See application file for complete search history.

(56) References Cited

U.S. PATENT DOCUMENTS

| | | | | |
|---|---|---|---|---|
| 4,715,348 A * | 12/1987 | Kobayashi | ............ | F02M 26/49 701/107 |
| 4,825,841 A * | 5/1989 | Norota | ................. | F02D 41/005 123/676 |
| 6,125,830 A * | 10/2000 | Kotwicki | ............ | F02D 41/0072 123/568.21 |
| 6,363,922 B1 * | 4/2002 | Romzek | ................ | F02M 26/49 123/568.16 |
| 6,459,985 B1 * | 10/2002 | Kotwicki | ............ | F02D 41/0072 701/103 |
| 6,480,782 B2 * | 11/2002 | Brackney | ............ | F02D 41/0052 123/568.21 |

(Continued)

FOREIGN PATENT DOCUMENTS

JP H09-138182 A 5/1997
JP H11-247701 A 9/1999

(Continued)

*Primary Examiner* — Nathaniel T Woodward
(74) *Attorney, Agent, or Firm* — Morgan, Lewis & Bockius LLP

(57) ABSTRACT

An apparatus for diagnosing a failure of a sensor may include an engine; an intake manifold; a turbocharger including a turbine rotated by exhaust gas of the combustion chamber and a compressor provided at the intake line, rotated in connection with the turbine, and compressing external air; a map sensor measuring a pressure of a front end portion of the compressor; a differential pressure sensor measuring a differential pressure of front and rear end portions of an EGR valve provided at an EGR apparatus; an operation information detecting device measuring operation information including an engine speed and a load; and a controller determining whether an exhaust gas pressure is constant from the operation information and comparing a change amount of the differential pressure sensor signal and a change amount of the map sensor signal in the condition that the exhaust gas pressure is constant to diagnose a failure of the differential pressure sensor.

4 Claims, 3 Drawing Sheets

(56) References Cited

U.S. PATENT DOCUMENTS

| | | | | |
|---|---|---|---|---|
| 6,659,095 B2* | 12/2003 | Kotwicki | ............ | F02D 41/0072 123/479 |
| 6,848,434 B2* | 2/2005 | Li | .......................... | F02M 26/47 123/568.12 |
| 6,850,833 B1* | 2/2005 | Wang | .................. | F02D 41/0055 123/568.12 |
| 7,963,275 B2* | 6/2011 | Stein | ....................... | F02D 37/00 123/559.1 |
| 9,267,453 B2* | 2/2016 | Surnilla | .................. | F02M 26/07 |
| 2012/0272938 A1* | 11/2012 | Blumendeller | ......... | F02D 21/08 123/568.11 |
| 2014/0324323 A1* | 10/2014 | Gates | .................. | F02D 41/0072 701/108 |
| 2016/0222925 A1* | 8/2016 | Baeuerle | ............ | F02D 41/0065 |

FOREIGN PATENT DOCUMENTS

| | | |
|---|---|---|
| JP | 4306139 B2 | 5/2009 |
| KR | 10-2014-0007291 A | 1/2014 |
| WO | WO 2015/039800 A1 | 3/2015 |

* cited by examiner

APPARATUS AND METHOD FOR DIAGNOSING FAILURE OF SENSOR

CROSS-REFERENCE TO RELATED APPLICATION

The present application claims priority to Korean Patent Application No. 10-2016-0099033 filed on Aug. 3, 2016, the entire contents of which is incorporated herein for all purposes by this reference.

BACKGROUND OF THE INVENTION

Field of the Invention

The present invention relates to an apparatus and a method for diagnosing a failure of a sensor. More particularly, the present invention relates to an apparatus and a method for diagnosing a failure of a differential pressure sensor measuring a differential pressure of a front end portion and a rear end portion of an exhaust gas recirculation (EGR) valve.

Description of Related Art

An engine of a vehicle combusts a mixture of air inflowing from the outside and a fuel with an appropriate ratio to generate power.

In a process of generating the power by driving of the engine, the external air for combustion must be appropriately supplied to obtain a desired output and combustion efficiency. For this, a turbocharger as a device for turbocharging the air for the combustion to increase the combustion efficiency of the engine is used.

In general, a turbocharger is a device that rotates a turbine by using pressure of exhaust gas discharged from an engine and thereby increases output of the engine by supplying high-pressure air to a combustion chamber by using rotational force thereof. The turbocharger is applied to both a diesel engine and a gasoline engine.

Further, a nitrogen oxide (NOx) included in the exhaust gas is regulated as an atmospheric pollution source and there has been an effort to lessen exhaust of NOx.

An exhaust gas recirculation (EGR) system has been provided to a vehicle for reducing noxious exhaust gas. Generally, NOx is increased in a case where an air-fuel ratio of an air-fuel mixture is high, which is necessary for sufficient combustion. Thus, the exhaust gas recirculation system mixes exhaust gas from an engine with the air-fuel mixture, for example at 5-20%, thereby reducing the amount of oxygen in the air-fuel mixture and obstructing combustion, and so lessening generation of NOx.

The exhaust gas recirculation (EGR) system of the gasoline engine is a system mounted to the vehicle for fuel consumption improvement. A pumping loss may be reduced in a low speed/low load situation through the exhaust gas recirculation system, and ignition timing may be advanced because of a temperature reduction of a combustion chamber may be advanced, thereby improving the fuel consumption of the vehicle.

As a representative exhaust gas recirculation system, there is a low pressure exhaust gas recirculation (LP-EGR:) device. The LP-EGR device recirculates the exhaust gas passing through a turbine of the turbocharger into an intake pathway of a front stage of a compressor.

The exhaust gas recirculation system according to a conventional art supplies the recirculation gas to the combustion chamber of the engine by a torque of the turbine and the compressor when the turbocharger is operating.

In the exhaust gas recirculation system, a differential pressure sensor detecting a pressure difference between a front end portion and a rear end portion of an EGR valve controlling the recirculation gas amount is provided, and when an error is generated in a signal of the differential pressure sensor, it is impossible to correctly control an EGR ratio such that damage may be generated in the engine.

Also, in the exhaust gas recirculation system, because the differential pressure of the front end portion and the rear end portion of the EGR valve is different for each operation region of the engine, it is difficult to verify reliability of the signal of the differential pressure sensor.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for correctly diagnosing a failure of a differential pressure sensor sensing a differential pressure of a front end portion and a rear end portion of an EGR valve of an exhaust gas recirculation apparatus.

An apparatus for diagnosing a failure of a sensor according to an exemplary embodiment of the present invention includes: an engine including a plurality of combustion chambers generating a driving torque by combustion of a fuel and an intake manifold distributing an intake gas inflowing to the combustion chamber; a turbocharger including a turbine rotated by exhaust gas exhausted from the combustion chamber and a compressor provided at the intake line, rotated in connection with the turbine, and compressing external air; a map sensor measuring a pressure of a front end portion of the compressor; a differential pressure sensor measuring a differential pressure of a front end portion and a rear end portion of an EGR valve provided at an EGR apparatus; an operation information detecting device measuring operation information including an engine speed and a load; and a controller determining whether an exhaust gas pressure is constant from the operation information and comparing a change amount of the differential pressure sensor signal and a change amount of the map sensor signal in the condition that the exhaust gas pressure is constant to diagnose a failure of the differential pressure sensor.

A differential pressure generation valve provided at the front end portion of the compressor of the intake line flowing the intake gas supplied to the combustion chamber and generating a negative pressure to the front end portion of the compressor may be further included, and the controller may control the differential pressure generation valve if the exhaust gas pressure is constant to generate a negative pressure at the front end portion of the compressor, and may compare a change amount of the differential pressure sensor signal depending on the differential pressure and a change amount of the map sensor signal to diagnose a failure of the differential pressure sensor.

The controller may determine that the differential pressure sensor has failed if a difference of the change amount of the differential pressure sensor signal and the change amount of the map sensor signal is more than a threshold value.

It may be determined that the differential pressure sensor is normal if a difference of the change amount of the differential pressure sensor signal and the change amount of the map sensor signal is less than a threshold value.

The condition that the exhaust gas pressure may be constant is a case that the engine speed and the engine load are constantly maintained during a predetermined time.

A method for diagnosing failure of a sensor according to another exemplary embodiment of the present invention includes: sensing operation information including an engine speed and an engine load by an operation information detecting device; determining whether an exhaust gas pressure is constant from the operation information by a controller; and comparing a change amount of a differential pressure sensor signal and a change amount of a map sensor signal by the controller in the condition that the exhaust gas pressure is constant to diagnose a failure of the differential pressure sensor.

The diagnosis step may include: generating a negative pressure to a compressor front end portion of a turbocharger by a differential pressure generation valve; and comparing a difference of the change amount of the differential pressure sensor signal depending on the negative pressure generated by the differential pressure generation valve and the change amount of the map sensor signal with a threshold value.

It may be determined that the differential pressure sensor has failed if the difference is more than the threshold value.

It may be determined that the differential pressure sensor is normal if the difference is less than the threshold value.

The condition that the exhaust gas pressure is constant may be a case that an engine speed and an engine load satisfy a predetermined condition during a predetermined time.

According to the apparatus and the method for the failure diagnosis of the sensor according to an exemplary embodiment of the present invention, in the condition that the exhaust gas pressure is constant, the change amount of the differential pressure sensor signal and the change amount of the manifold absolute pressure (MAP) sensor signal are compared, thereby diagnosing the failure of the differential pressure sensor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
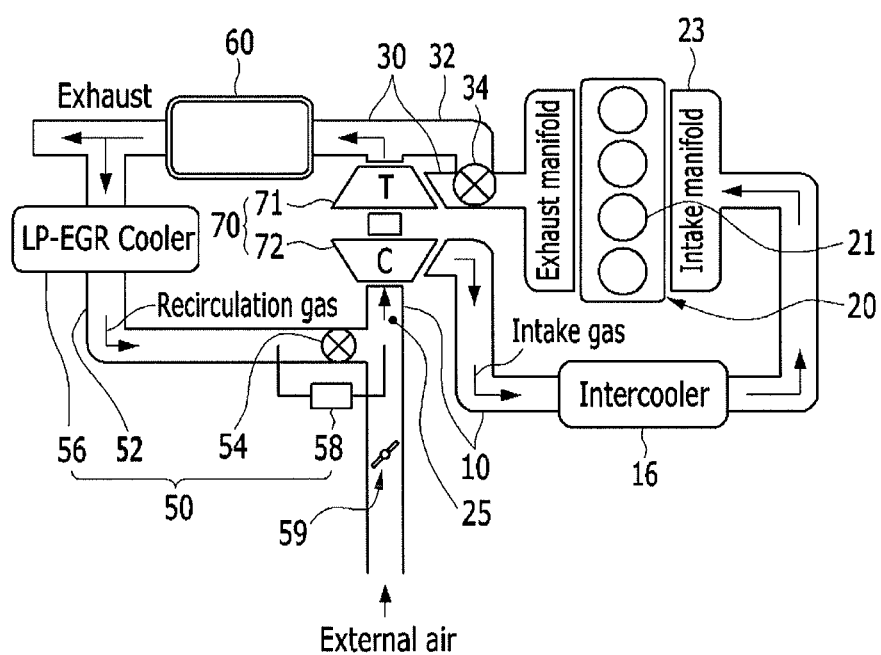
FIG. 1 is a schematic view of a configuration of an engine system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to clarify the present invention, parts that are not connected with the description will be omitted, and the same elements or equivalents are referred to by the same reference numerals throughout the specification.

The size and thickness of each element are arbitrarily shown in the drawings, and the present invention is not necessarily limited thereto, and in the drawings, the thickness of layers, films, panels, regions, etc., are exaggerated for clarity.

Now, a failure diagnosis apparatus of a sensor according to an exemplary embodiment of the present invention will be described with reference to accompanying drawings.

Figure 2:
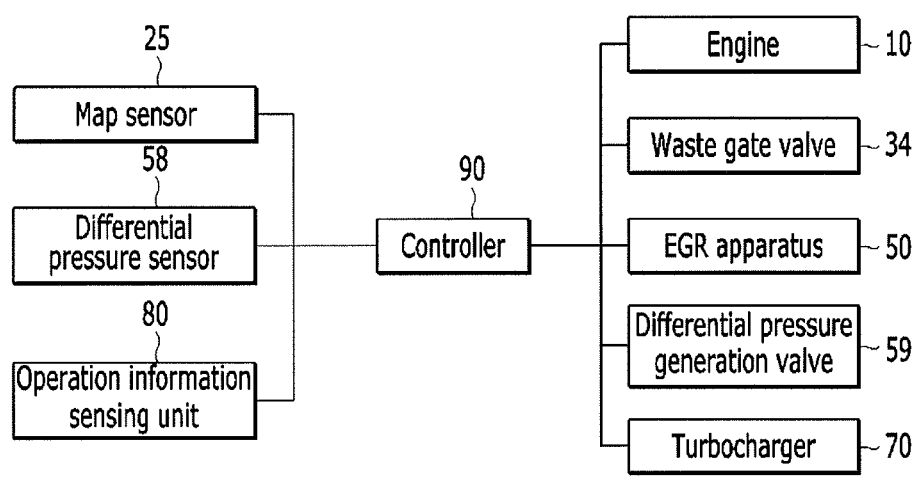
FIG. 2 is a block diagram of a configuration of a failure diagnosis apparatus of a sensor according to an exemplary embodiment of the present invention.

FIG. 1 is a schematic view of a configuration of an engine system according to an exemplary embodiment of the present invention. FIG. 2 is a block diagram of a configuration of a failure diagnosis apparatus of a sensor according to an exemplary embodiment of the present invention.

As shown in FIG. 1, an engine system applied with a failure diagnosis apparatus of a sensor according to an exemplary embodiment of the present invention includes an engine 20, a turbocharger 70, an exhaust gas recirculation (EGR) apparatus 50, an operation information detecting device 80, and a controller 90.

The engine 20 includes a plurality of combustion chambers 21 generating a driving torque by combustion of a fuel and an intake manifold 23 distributing an intake gas to the combustion chamber 21. An intake line 10 flowing an intake gas supplied to the combustion chamber 21 and an exhaust line 30 flowing an exhaust gas exhausted from the combustion chamber 21 are provided to the engine 20.

An exhaust gas purification device 60 purifying various harmful material included in the exhaust gas exhausted from the combustion chamber 21 is provided in the exhaust line 30. The exhaust gas purification device 60 may include a Lean NOx Trap (LNT) for purifying a nitrogen oxide, a diesel oxidation catalyst, and a diesel particulate filter.

The turbocharger 70 compresses an intake gas (external air+recirculation gas) inflowing through the intake line 10 to be supplied to the combustion chamber 21. The turbocharger 70 includes a turbine 71 provided in the exhaust line 30 and rotated by the exhaust gas exhausted from the combustion chamber 21, and a compressor 72 rotated in connection with the turbine 71 and compressing the intake gas.

The EGR apparatus 50 includes a recirculation line 52, an EGR cooler 56, an EGR valve 54, a differential pressure sensor 58, and a differential pressure generation valve 59.

A map sensor 25 measuring a pressure of a front end portion of the compressor 72 is installed between the differential pressure generation valve 59 and the compressor 72. In this case, the map sensor 25 may measure a negative pressure generated by the operation of the differential pressure generation valve 59, and the pressure measured by the map sensor 25 is transmitted to the controller 90.

The recirculation line 52 is branched from the exhaust line 30 of the rear end portion of the turbocharger 70 and is joined to the intake line 10. The EGR cooler 56 is disposed at the EGR line 52 and cools the exhaust gas flowing in the recirculation line 52. The EGR valve 54 is disposed at a position where the EGR line 52 and the intake line 10 are joined, and controls a recirculation gas amount inflowing to the intake line 10. Here, the exhaust gas supplied to the intake line 10 through the recirculation line 52 is referred to as the recirculation gas. The differential pressure sensor 58 detects the differential pressure of the front end portion and the rear end portion of the EGR valve, and the detected differential pressure is transmitted to the controller 90.

The differential pressure generation valve 59 is installed at the front end portion of the compressor 72 of the intake line 10 to generate the negative pressure to the front end portion of the compressor 72. The differential pressure generation valve 59 is opened in a normal state, however, if necessary, while the differential pressure generation valve 59 is closed by a predetermined amount, the negative pressure is generated at the front end portion of the compressor 72 while the flow rate of the intake gas flowing in the intake line 10 is faster.

An intercooler 16 cools the intake gas inflowing through the intake line 10 through heat exchange with a coolant. That is, since the temperature of the intake gas compressed by the turbocharger 70 is increased such that the intake gas is expanded, oxygen density of the intake gas supplied to the combustion chamber 21 is decreased, thereby it is difficult to output the torque required in the engine 20. Accordingly, the intake gas is cooled through the intercooler 16 such that the density of the intake gas is increased, thereby improving the combustion efficiency of the engine 20.

The operation information detection unit 80 senses operation information, and the sensed operation information is transmitted to the controller 90. The operation information includes an engine speed and an engine load.

The controller 90 controls operations of the engine 20, the turbocharger 70, the differential pressure generation valve 59, and the EGR apparatus 50 depending on the operation information sensed in the operation information detecting device 80.

For this, the controller 90 may be provided with at least one processor operated by a predetermined program, and the predetermined program may perform each step of an engine control method according to an exemplary embodiment of the present invention.

The controller 90 determines whether there is a condition that the exhaust gas pressure is constant from the operation information. The condition that the exhaust gas pressure is constant may be a case that the engine speed and the engine load are constantly maintained during a predetermined time. That is, if the engine speed and the engine load are constantly maintained during a predetermined time, because the exhaust gas pressure exhausted from the combustion chamber is constantly maintained, the failure of the differential pressure sensor 58 may be diagnosed through the change amount of the differential pressure sensor 58 under this condition.

If the exhaust gas pressure is rapidly changed, because the differential pressure is rapidly changed at the front and rear end portions of the EGR valve, it is difficult to diagnosis the failure of the differential pressure sensor 58. Accordingly, in the condition that the exhaust gas pressure is constantly maintained, it is preferable to diagnose the failure of the differential pressure sensor 58.

If the exhaust gas pressure is constant, the controller 90 controls the differential pressure generation valve 59 to generate the negative pressure at the front end portion of the compressor 72 and compares the change amount of the signal of the differential pressure sensor 58 by the negative pressure and the change amount of the signal of the map sensor 25 signal to determines the failure of the differential pressure sensor 58.

Hereinafter, a failure diagnosis method of the sensor according to an exemplary embodiment of the present invention will be described with reference to accompanying drawings.

Figure 3:
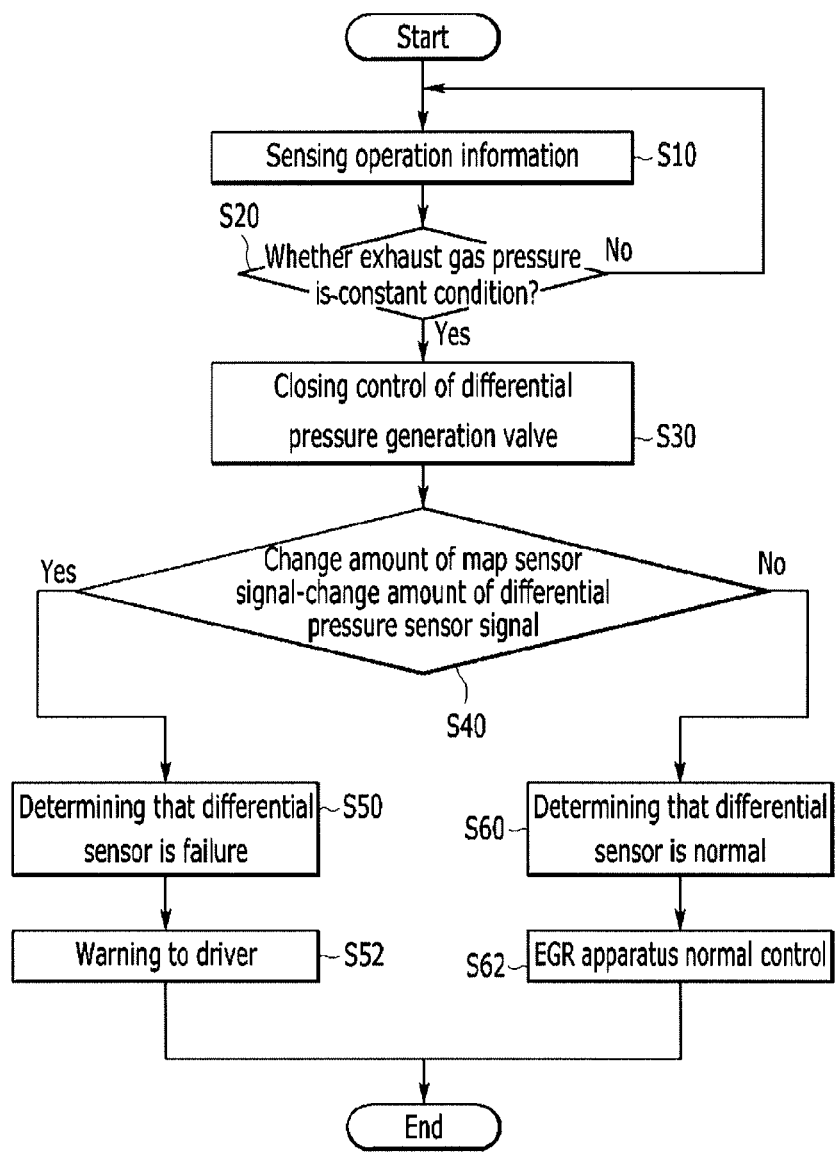
FIG. 3 is a flowchart of a failure diagnosis method of a sensor according to an exemplary embodiment of the present invention.

FIG. 3 is a flowchart of a failure diagnosis method of a sensor according to an exemplary embodiment of the present invention.

As shown in FIG. 3, the operation information detecting device 80 senses the operation information of the vehicle and the sensed operation information is transmitted to the controller 90 (S10). The operation information may include the engine speed and the engine load.

The controller 90 determines whether the exhaust gas pressure is constant from the operation information (S20). In this case, if the engine speed and the engine load are constantly maintained during a predetermined time, the exhaust gas pressure satisfies the constant condition.

If the exhaust gas pressure satisfies the constant condition, the controller 90 controls the differential pressure generation valve 59 to be closed by a predetermined amount, thereby forming the negative pressure to the front end portion of the compressor 72 (S30).

The controller 90 calculates the difference of the change amount of the signal of the map sensor 25 depending on the differential pressure generated by the differential pressure generation valve 59 and the change amount of the signal of the differential pressure sensor 58, and compares the difference of the change amount of the signal of the map sensor 25 and the change amount of the signal of the differential pressure sensor 58 with a threshold value (S40), and if the difference is more than the threshold value, it is determined that the differential pressure sensor 58 has failed (S50), while if the difference is less than the threshold value, it is determined that the differential pressure sensor 58 is normal (S60).

In the condition that the exhaust gas pressure is constant, the change amount of the signal of the differential pressure sensor 58 according to the change amount of the signal of the map sensor 25 must be in a predetermined range.

For example, in the condition that the exhaust gas pressure is constant, if the change of the signal of the map sensor 25 is −2 kPa (99 kPa→97 kPa), the change of the signal of the differential pressure sensor 58 must be +2 kPa (10 kPa→12 kPa), however if the change of the signal of the differential pressure sensor 58 is less or more than 2 kPa by the predetermined amount (the threshold value), it may be determined that the differential pressure sensor 58 has failed.

If it is determined that the differential pressure sensor 58 has failed, the controller 900 does not normally control the EGR apparatus 50, but may generate a warning (S52). In this case, the controller 90 may warn the driver of the failure of the differential pressure sensor 58 through a cluster, an instrument panel, etc.

However, the controller 90 normally controls the EGR apparatus 50 to supply the recirculation gas to the combustion chamber if the differential pressure sensor 58 is normal (S62).

According to the apparatus and the method for the failure diagnosis of the sensor of the present invention, the change amount of the signal of the map sensor 25 and the change amount of the signal of the differential pressure sensor 58 may be compared to determine the failure of the differential pressure sensor 58.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for failure diagnosis of a differential pressure sensor, comprising:
   an engine including a plurality of combustion chambers generating a driving torque by combustion of a fuel and an intake manifold distributing an intake gas inflowing to the combustion chambers;
   a turbocharger including a turbine rotated by an exhaust gas exhausted from the combustion chambers and a compressor provided at an intake line, rotated in connection with the turbine, and compressing external air;
   a map sensor measuring a pressure of a front end portion of the compressor;
   the differential pressure sensor measuring a differential pressure of a front end portion and a rear end portion of an exhaust gas recirculation (EGR) valve provided at an EGR apparatus including the differential pressure sensor, wherein the EGR apparatus is mounted to the turbocharger;
   an operation information detecting device measuring operation information including an engine speed and an engine load; and
   a controller determining whether an exhaust gas pressure is constant from the operation information measured by the operation information detecting device and comparing a change amount of a differential pressure sensor signal and a change amount of a map sensor signal in a condition that the exhaust gas pressure is constant to diagnose a failure of the differential pressure sensor; and
   a differential pressure generation valve provided at a front end portion of the compressor of the intake line for flowing the intake gas supplied to the combustion chambers and generating a negative pressure to the front end portion of the compressor,
   wherein the controller is configured to control the differential pressure generation valve when the exhaust gas pressure is constant to generate the negative pressure at the front end portion of the compressor, and is configured to compare a change amount of the differential pressure sensor signal depending on the differential pressure and the change amount of the map sensor signal to diagnose the failure of the differential pressure sensor,
   wherein the controller is configured to determine that the differential pressure sensor has failed when a difference of the change amount of the differential pressure sensor signal and the change amount of the map sensor signal is more than a predetermine value, and
   wherein it is determined that the differential pressure sensor is normal when the difference of the change amount of the differential pressure sensor signal and the change amount of the map sensor signal is less than the predetermined value.

2. The apparatus of claim 1, wherein the condition that the exhaust gas pressure is constant is a case that the engine speed and the engine load are constantly maintained during a predetermined time.

3. A method for diagnosing a failure of a differential pressure sensor, comprising:
   sensing operation information including an engine speed and an engine load by an operation information detecting device;
   determining, by a controller, whether an exhaust gas pressure is constant from the operation information detected by the operation information detecting device; and
   comparing, by the controller, a change amount of the differential pressure sensor signal and a change amount of a map sensor signal by the controller in a condition that the exhaust gas pressure is constant for diagnosing the failure of the differential pressure sensor,
   wherein the diagnosing the failure of the differential pressure sensor includes:
      generating a negative pressure to a compressor at a front end portion of a turbocharger by a differential pressure generation valve; and
      comparing a difference of the change amount of the differential pressure sensor signal depending on the negative pressure generated by the differential pressure generation valve and the change amount of the map sensor signal with a predetermined value,
   wherein it is determined, by the controller, that the differential pressure sensor has failed when the difference is more than the threshold value, and
   wherein it is determined, by the controller, that the differential pressure sensor is normal when the difference is less than the predetermined value.

4. The method of claim 3, wherein the condition that the exhaust gas pressure is constant is a case that the engine speed and the engine load satisfy a predetermined condition during a predetermined time.

* * * * *